United States Patent [19]

Lukasik et al.

[11] 3,764,158
[45] Oct. 9, 1973

[54] ADJUSTABLE CONNECTION
[75] Inventors: John A. Lukasik, Dundee; Patrick J. McCarthy, Livonia, both of Mich.
[73] Assignee: Ford Motor Company, Dearborn, Mich.
[22] Filed: July 5, 1972
[21] Appl. No.: 268,945

[52] U.S. Cl............ 280/124 R, 267/57.1 A, 267/66
[51] Int. Cl............................................. B60g 11/14
[58] Field of Search ................. 280/124 R, 104.5 B; 267/63 R, 63 A, 66, 57.1 R, 57.1 A

[56] References Cited
UNITED STATES PATENTS
1,475,348  11/1923  McGowen.......................... 267/66 X
3,572,677  3/1971  Damon............................ 267/57.1 R Primary Examiner—Philip Goodman
Attorney—Keith L. Zerschling et al.

[57] ABSTRACT

An adjustable connection, in accordance with the preferred embodiment of the invention, includes a tube connected to one member, an undersize bolt connected to another member, and a spring clip positioned within the tube that is constructed to support the bolt eccentrically with respect to the axis of the tube. The spring clip is rotatable within the tube to permit angular adjustment of the axis of the bolt with respect to the axis of the tube. A pair of these connections, when used in a vehicle suspension to connect a suspension arm to sprung and unsprung members, provide a means to adjust the effective length of the suspension arm.

3 Claims, 5 Drawing Figures

PATENTED OCT 9 1973　　　　　　　　　　　　　　　　3,764,158

ADJUSTABLE CONNECTION

BACKGROUND OF THE INVENTION

The present invention relates to adjustable connection devices and is particularly suitable for use in connecting a suspension arm of a motor vehicle suspension system to sprung and unsprung suspension components.

Due to the manufacturing tolerances that are present in a mass produced motor vehicle, it is necessary to provide an adjustment means in a suspension system in order to permit positioning of the several suspension pivot axes at the desired designed location. The present invention provide a means for adjusting the location of the pivot axes with respect to the suspension arms in order to compensate for any misalignment resulting from a stack up of manufacturing tolerances.

BRIEF SUMMARY OF THE DISCLOSURE

While the present adjustable connection is suitable for a variety of applications, it is particularly appropriate for use in a vehicle suspension system where a suspension arm is connected to sprung and unsprung vehicle components. In accordance with the presently preferred embodiment of this invention, a pair of adjustable pivots connects the ends of a suspension arm to a vehicle frame bracket and to an axle housing bracket. Each adjustable pivot comprises an outer tube connected to the suspension arm and an inner tube connected to one of the brackets. An annular rubber member is fitted between the two tubes. A bolt fitted within the inner tube has an outside diameter smaller than the inside diameter of the inner tube and is secured to the appropriate bracket. A spring metal clip situated within the inner tube supports the bolt in an eccentric position with respect to the axis of the inner tube. The spring metal clip may be rotated within the inner tube whereby the axis of the support provided for the bolt is angularly displaced.

When an adjustable pivot in accordance with the present invention is situated at both ends of a suspension arm, means are provided during the assembly of the vehicle chassis for manually adjusting the effective length of the suspension arm as measured between the effecitve pivot centers at the ends of the arms.

BRIEF DESCRIPTION OF THE DRAWINGS

The many objects and advantages of a vehicle suspension system constructed in accordance with the present invention will become apparent upon consideration of the following description and the accompanying drawings, in which.

DETAILED DESCRIPTION

Figure 1:
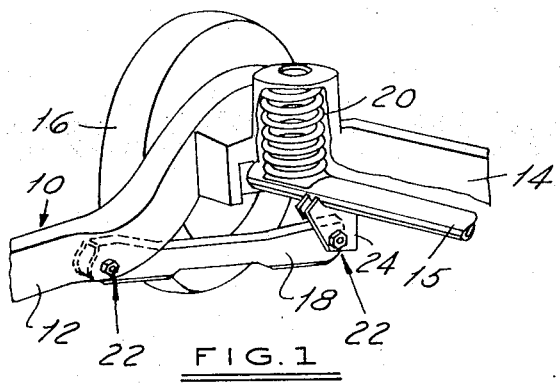
FIG. 1 is a perspective view of a motor vehicle suspension having a suspension arm connected to sprung and unsprung components by adjustable pivot means constructed in accordance with the invention.

Referring now to the drawings, wherein the presently preferred embodiment of this invention is illustrated, FIG. 1 discloses a motor vehicle suspension system having a chassis frame assembly 10 that includes a longitudinal frame rail 12 to which a frame cross member 14 is secured. A transverse axle housing 15 rotatably supports a road wheel 16 at its outer end. The jounce and rebound path of the axle housing 15 with respect to the frame assembly 10 is defined by a plurality of suspension arms including suspension arm 18. A coil type suspension spring 20 is interposed between the frame member 14 and the axle housing 15. the suspension spring 20 resiliently supports the sprung mass of the vehicle upon the axle housing 15 and wheels 16.

An adjustable pivotal connection assembly 22 connects the rear end of the suspension arm 18 to a bracket 24 welded to the axle housing 15. A similarly constructed second adjustable pivotal connection assembly 22 connects the forward end of the arm 18 to a bracket secured to the frame rail 12.

Figure 3:
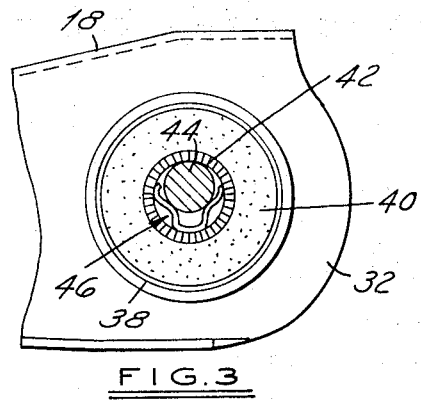
FIG. 3 is a side elevational view, partly in section, of the adjustable pivotal connection of FIG. 2.
Figure 2:
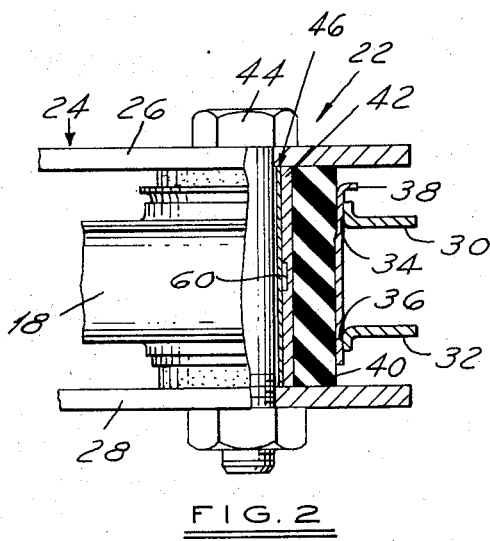
FIG. 2 is a top plan view partly in section of one of the pivotal connections between the suspension arm and either the frame bracket or axle housing bracket of FIG. 1.
Figure 4:
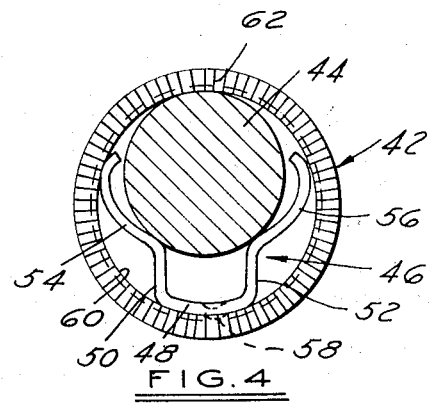
FIG. 4 is an enlarged end view of the inner tube, the pivot bolt and spring clip of FIG. 3.
Figure 5:
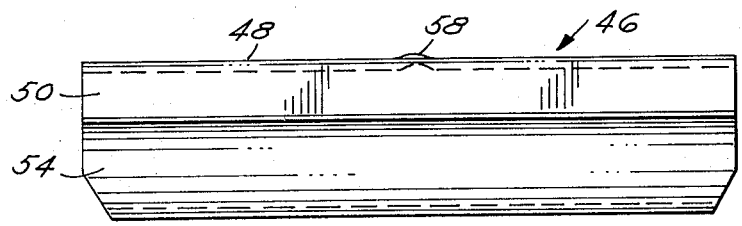
FIG. 5 is a side elevational view of the adjustable spring clip.

Referring now to FIGS. 2, 3 and 4, the axle housing bracket 24 includes side flanges 26 and 28. The suspension arm 18 has a generally U-shaped cross sectional construction formed with side flanges 30 and 32. The flanges 30 and 32 are formed with aligned openings 34 and 36 in which a tubular member 38 is pressfitted. The tube 38 is secured in the aligned openings 34 and 36 by means of an interference fit. An annular elastomeric element 40 is situated within the tube 38. An inner tube 42, in turn, is situated within the annular elastomeric member 40.

A pivot shaft or bolt 44 extends through aligned holes in the flange portions 26 and 28 of the axle housing bracket 24 and through the interior of the inner tube 42. As seen in FIGS. 3 and 4, the outside diameter of the pivot bolt 44 is substantially smaller than the inside diameter of the inner tube 42.

A spring metal clip 46 is positioned within the tube 42 and engages the bolt 44. the clip 46 provides support for the bolt 44 at an eccentric location with respect to the axis of the tube 42.

The cross sectional configuration of the spring clip 46 is best seen in FIG. 4. In cross section, the clip 46 has a channel-shaped intermediate portion comprising an arcuate midportion 48 that lays flush against the interior wall of the inner tube 42 and a pair of flat portions 50 and 52 arranged parallel to the plane which contains the axis of the tube 42 and the axis of the bolt 44. A pair of arcuate portions 54 and 56 are connected to the inner ends of the straight portions 50 and 52. Each of the arcuate portions 54 and 56 engages the bolt 44 near its junction with its respective straight portion 50 or 52. The outer ends of the arcuate portions 54 and 56 engages the tube 42.

The clip 46, therefore, engages the inner surface of the tube 42 at three spaced apart locations and it engages the bolt 44 at two spaced apart locations. The bolt 44 is thus supported by its two contacts with the clip 46 and its engagement with the interior of the tube 42.

Means are provided to retain the clip 46 in a central position within the tube 42. Situated at a midpoint on the surface of the arcuate midportion 48 is a small protrusion 58. A complementary annular groove 60 is formed in the inner wall of the tube 42. when the adjustable connection 22 is assembled the protrusion 58 is seated in the annular groove 60.

The ends of the tube 42 may be serrated as at 62 so that when the bolt 44 is tightened the tube ends will bite into and grip the flanges 26 and 28.

OPERATION

Referring now to FIG. 2, during normal operation the suspension arm 18 is secured to the outer tube 38 by an interference press fit. The inner tube 42 is clamped fast with the bracket 24 by the bolt 44. The arm 18 is then free to pivot about the axis of the bolt 44. Upon pivotal movement of the arm 18, deflection of the rubber 40 occurs as the outer tube 38 is angularly displaced relative to the inner tube 42.

The present invention provides a means for adjustably relocating the pivot axis of the bolt 44 about which the arm 18 swings. In order to perform the adjustment, an appropriate tool is entered into engagement with the clip 46 when the arm 18 is disconnected from the bracket 24. The clip 46 is rotated within the tube 42 by the tool whereby the axis of the bolt 44 is angularly displaced with respect to the axis of the tube 42. This adjustment of the location of the clip 46 changes the position of the bolt 44 with respect to the arm 18.

A tool having a fork like end with tangs that fit into the three spaces defined by the straight portions 50 and 52 is effective in forcing the relocation of the clip 46.

When a pair of the adjustable connections 27 are used to join the suspension arm 18 to brackets of the sprung and unsprung suspension components, the connections 22 are capable of increasing or decreasing the effective length of the arm 18 an amount sufficient to compensate for any misalignment resulting from manufacturing tolerances.

The foregoing description presents the presently preferred embodiment of this invention. Modifications and alterations may occur to those skilled in the art which will come within the scope and spirit of the following claims.

We claim:

1. A vehicle suspension assembly including a chassis frame member, an unsprung member and a suspension arm interposed between said members, first and second adjustable pivot means connecting said arm to said frame member and to said unsprung member respectively, each of said adjustable pivot means comprising an outer tube secured to said arm adjacent an end thereof, an inner tube connected to a respective one of said members, an annular elastomeric element interposed between said tubes, a pivot bolt positioned within said inner tube and connected to said one member, said bolt having a substantially smaller outside diameter than the inside diameter of said inner tube, the axis of said pivot bolt being spaced apart from the axis of said tube, a spring metal clip fitted within said tube and engaging said pivot bolt, said clip being constructed to cooperate with said tube to define a support for said bolt, said clips of said first and second adjustable pivot means being constructed to a slidably rotatably displacable about the axis of said inner tubes whereby the effective length of said arm between the axes of said pivot bolts is increased or decreased depending upon the displacement of said clips.

2. A vehicle suspension assembly according to claim 1 and including:

in each adjustable pivot means said spring metal clip comprising a sheet metal member having a plurality of arcuate portions, said clip having circumferentially spaced portions engaging said pivot bolt, said clip having circumferentially spaced portions engaging said inner tube.

3. A vehicle suspension assembly according to claim 1 and including:

in each adjustable pivot means said spring metal clip comprising a sheet metal member having a plurality of arcuate portions, said clip having three spaced portions engaging one of said tube and shaft and having two spaced portions engaging the other of said tube and shaft.

* * * * *